United States Patent
Yoneyama

[19]

[11] Patent Number: 6,128,129
[45] Date of Patent: Oct. 3, 2000

[54] AUTOMATIC FOCUSING APPARATUS FOR MICROSCOPE

[75] Inventor: Takashi Yoneyama, Sagamihara, Japan

[73] Assignee: Olympus Optical Co., Ltd., Tokyo, Japan

[21] Appl. No.: 09/223,697

[22] Filed: Dec. 30, 1998

[30] Foreign Application Priority Data

Jan. 6, 1998 [JP] Japan ................................. 10-000595
Jan. 14, 1998 [JP] Japan ................................. 10-005289

[51] Int. Cl.$^7$ .................................................... G02B 21/00
[52] U.S. Cl. ........................ 359/383; 359/392; 250/201.3
[58] Field of Search .................................. 359/368, 382, 359/383, 391, 392; 250/201.3

[56] References Cited

U.S. PATENT DOCUMENTS

| | | | |
|---|---|---|---|
| 4,803,352 | 2/1989 | Bierleutgeb | 250/201.3 |
| 5,672,861 | 9/1997 | Fairley et al. | 250/201.3 |
| 5,790,710 | 8/1998 | Price et al. | 382/255 |

FOREIGN PATENT DOCUMENTS 59-10913 1/1984 Japan .
63-78113 4/1988 Japan .

*Primary Examiner*—Cassandra Spyrou
*Assistant Examiner*—Mark A. Robinson
*Attorney, Agent, or Firm*—Frishhauf, Holtz, Goodman, Langer & Chick, P.C.

[57] ABSTRACT

An optical-path-difference automatic focusing apparatus for a microscope uses four automatic focusing control modes including an object search mode in which an object to be observed is searched for, a rough focus mode in which the object is brought to a roughly focused position with a lower accuracy of focusing, a front and back defocus sensing mode in which the degrees of front and back focusing of the object in at least a front and a back place with respect to the roughly focused position in the rough focus mode, and a fine focus mode in which the degree of focusing of the object with a higher accuracy of focusing is approximated linearly on the basis of the degrees of front and back focusing determined in the front and back defocus sensing mode and the object is brought to the focused position. Use of those modes realizes a highly reliable automatic focusing apparatus for a microscope capable of achieving a higher accuracy of focusing, regardless of the change of the optical condition.

12 Claims, 7 Drawing Sheets

| MAGNIFICATION OF OBJECTIVE | N A | FOCAL DEPTH ($\mu$m) | TYPE OF OBJECTIVE |
|---|---|---|---|
| 0.5 | 0.02 | 1375 | EXTREMELY LOW MAGNIFICATION |
| 1.25 | 0.04 | 343 | VERY LOW MAGNIFICATION |
| 2 | 0.08 | 86 | |
| 4 | 0.16 | 21 | LOW MAGNIFICATION |
| 10 | 0.4 | 3.4 | |
| 20 | 0.7 | 1 | HIGH MAGNIFICATION |
| 40 | 1.0 | 0.4 | |
| 100 | 1.4 | 0.21 | |

FIG. 6

AUTOMATIC FOCUSING APPARATUS FOR MICROSCOPE

BACKGROUND OF THE INVENTION

The present invention relates to an automatic focusing apparatus for a microscope.

Various techniques for sensing the focal point of an optical instrument, such as an microscope, have been proposed. One of them is an automatic focusing apparatus using an optical path difference method.

In the automatic focusing apparatus for a microscope using the optical path difference method, the following two points particularly become problems:

1. Since some objectives of microscopes have an extremely low magnification of less than ×1 and others have a high magnification of ×100, automatic focusing control suitable for the magnification range of such objectives.

2. When the contrast of a specimen, an object to be observed, is low, the signal-to-noise ratio gets worse in the focused position of a defocus signal indicating the degree of focusing of the specimen (object) and the accuracy of focusing decreases.

These problems will be explained below. The characteristic of the contrast value (defocus signal) with respect to the change of the magnification of the objective is shown in FIG. 1A to FIG. 1C.

In FIG. 1A to FIG. 1C, each vertical line represents the contrast value of the specimen and each horizontal line represents the position of the stage in the direction of Z (in the direction of optical axis).

As shown in FIG. 1A to FIG. 1C, when the magnification of the objective changes from high to low or from low to high, the optical path difference with respect to the position of the surface of the specimen is inversely proportional to the square of the magnification of the objective. Specifically, when the magnification of the objective is low, the contrast characteristic of the contrast value in the front focused position separates too far from that in the back focused position as shown in FIG. 1A, as compared with an ideal case shown in FIG. 1B. As a result, the contrast value in the actual focused position decreases, which decreases the signal-to-noise ratio.

In contrast, when the magnification of the objective is high, the characteristic of the contrast value in the front focused position is too close to that in the back focused position as shown in FIG. 1C, which makes smaller the difference between the front focused position and the back focused position. As a result, the optical path difference in effecting automatic focusing control is less likely to appear.

Specifically, with the conventional automatic focusing apparatus for a microscope, because the signal-to-noise ratio of the contrast value of the specimen gets worse at low magnifications and the optical path difference is less likely to appear, both of these factors make automatic focusing control difficult.

When the specimen has a low contrast value, a focus judgment is made in a region where the contrast value of the specimen is lower than the maximum value because of the characteristic of the optical path difference method, which leads to a decrease in the accuracy of focusing. It is clear that the lower the magnification becomes, the worse the accuracy of focusing.

To solve the above problems, in a focal point sensing apparatus disclosed in, for example, Jpn. Pat. Appln. KOKAI Publication No. 59-10913, a zoom mechanism operating in inverse proportion to the magnification of the objective is inserted in the optical path to offset the change of the optical path difference caused by the magnification of the objective.

Furthermore, in the case of an automatic focusing mechanism for a microscope disclosed in Jpn. Pat. Appln. KOKAI Publication No. 63-78113, a prism that changes the optical path difference according to the magnifica- tion of the objective is inserted in the optical path to suppress the change of the optical path difference in a similar manner.

Both of the automatic focusing apparatuses require an optical path difference changing mechanism, such as a zoom mechanism or a prism switching mechanism. This not only makes the microscope larger and raises costs but also needs the parfocalizing of the zoom mechanism and adjustment of the prism, which decreases the reliability of the microscope seriously.

Furthermore, in the case of a specimen with a low contrast value, some portions have high contrast values and others have low contrast values. Therefore, it is impossible to secure the accuracy of focusing by changing the optical path difference as described above.

BRIEF SUMMARY OF THE INVENTION

Accordingly, it is an object of the present invention to provide a highly reliable automatic focusing apparatus for a microscope which secures a high accuracy of focusing in spite of the change of the magnification of an objective or a specimen with a low contrast value without making the apparatus larger or raising costs.

According to one aspect of the present invention, there is provided an automatic focusing apparatus for a microscope, comprising: mounting means on which an object to be observed is placed; an objective caused to face the object on the mounting means; driving means for driving at least one of the mounting means and the objective; an image forming optical system for forming an image of the object via the objective; an optical path difference optical system for giving an optical path difference to a front focused position and a back position that are conjugate with respect to the image forming point of the image forming optical system; image sensing means for sensing the image of the object via the optical path difference optical system; and control means for determining the degree of focusing of the object on the basis of image information from the image sensing means and causing the driving means to operate to direct the object on the mounting means to a focused position, wherein the control means has four automatic focusing control modes: an object search mode in which an object to be observed is searched for, a rough focus mode in which the object is brought to a roughly focused position with a lower accuracy of focusing, a front and back defocus sensing mode in which the degrees of front and back focusing of the object in at least a front and a back place with respect to the roughly focused position in the rough focus mode are determined, and a fine focus mode in which the degree of focusing of the object with a higher accuracy of focusing is approximated linearly on the basis of the degrees of front and back focusing determined in the front and back defocus sensing mode and the object is brought to the focused position.

In the automatic focusing apparatus for the microscope, the control means may change the order in which the four modes are executed or omits part of the four modes in accordance with the change of the image forming performance of the image forming optical system including the magnification of the objective in executing the four automatic focusing control modes.

In the automatic focusing apparatus for the microscope, the control means may omit the execution of the front and back defocus sensing mode and the fine focus mode when the magnification of the objective is equal to or larger than a specific value.

In the automatic focusing apparatus for the microscope, the control means may omit the execution of the object search mode when the magnification of the objective is lower than the specific value.

In the automatic focusing apparatus for the microscope, the control means, in the front and back defocus sensing mode, may determine the contrast value of the object when the magnification of the objective is extremely low and change the mode to the fine focus mode only when the contrast value is equal to or larger than a specific value.

The automatic focusing apparatus for the microscope may further comprise means for sensing the type of the objective used and informing the control means of the sensed type.

The automatic focusing apparatus for the microscope may further comprise an external controller for instructing the control means on the magnification of an objective to be used.

In the automatic focusing apparatus for the microscope, the control means, in the object search mode, may sense a position at which the sum of the contrast value in the front position and that in the back position is equal to or larger than a specific value and the difference between the contrast value in the back position and that in the front position is equal to or larger than a specific value.

In the automatic focusing apparatus for the microscope, it is desirable that at least the front place and the back place in the front and back defocus sensing mode are located in positions on which variations in the defocus value have no effect.

In the automatic focusing apparatus for the microscope, the control means, in the fine focus mode, may calculate the driving distance from one of the front place and the back place to the focused position on the basis of the degrees of front and back focusing determined in the front and back defocus sensing mode.

According to another aspect of the present invention, there is provided an automatic focusing apparatus for a microscope, comprising: mounting means on which an object to be observed is placed; an objective caused to face the object on the mounting means; driving means for driving at least one of the mounting means and the objective; an image forming optical system for forming an image of the object via the objective; an optical path difference optical system for giving an optical path difference to a front position and a back position that are conjugate with respect to the image forming point of the image forming optical system; image sensing means for sensing the image of the object via the optical path difference optical system; and control means for determining the degree of focusing of the object on the basis of image information from the image sensing means and causing the driving means to operate to direct the object on the mounting means to a focused position, wherein the control means has four automatic focusing control modes: an object search mode in which an object to be observed is searched for, a rough focus mode in which the object is brought to a roughly focused position with a lower accuracy of focusing, a defocus sensing mode in which the degree of focusing of the object in two places either in front of or behind the roughly focused position in the rough focus mode is determined, and a fine focus mode in which the degree of focusing of the object with a higher accuracy of focusing is approximated linearly on the basis of the degree of focusing determined in the defocus sensing mode and the object is brought to the focused position.

According to another aspect of the present invention, there is provided an automatic focusing apparatus for a microscope, comprising: mounting means on which an object to be observed is placed; an objective caused to face the object on the mounting means; driving means for driving at least one of the mounting means and the objective; an image forming optical system for forming an image of the observed object via the objective; an optical path difference optical system for giving an optical path difference to a front position and a back position that are conjugate with respect to the image forming point of the image forming optical system; image sensing means for sensing the image of the object via the optical path difference optical system; and control means for determining the degree of focusing of the object on the basis of image information from the image sensing means and causing the driving means to operate to direct the object on the mounting means to a focused position, wherein the control means has four automatic focusing control modes: an object search mode in which an object to be observed is searched for by sensing a position at which the sum of the contrast value in the front position and that in the back position is equal to or larger than a specific value and the difference between the contrast value in the back position and that in the front position is equal to or larger than a specific value, a rough focus mode in which the object is brought to a roughly focused position with a lower accuracy of focusing, a front and back defocus sensing mode in which the degrees of front and back focusing of the object in at least a place in front of and a place behind the roughly focused position in the rough focus mode, both places unaffected by variations in the defocus value, are determined, and a fine focus mode in which the degree of focusing of the object with a higher accuracy of focusing is approximated linearly by calculating the driving distance from the front place to the focused position and that from the back place to the focused position on the basis of the degrees of front and back focusing determined in the front and back defocus sensing mode and the object is brought to the focused position.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention in which:

FIG. 6 is a table showing the magnification of an objective, NA, and the focal depth;

DETAILED DESCRIPTION OF THE INVENTION

Hereinafter, referring to the accompanying drawings, embodiments of the present invention will be explained.

First Embodiment

A first embodiment of an automatic focusing apparatus for a microscope according to the present invention will be explained by reference to FIG. 2.

Figure 1A:
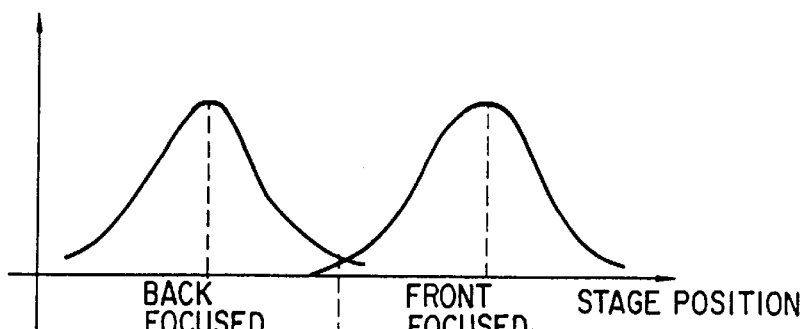
FIG. 1A to FIG. 1C show the contrast characteristic of the contrast value in the front focused position of the image of a specimen and that in the back focused position in a conventional automatic focusing apparatus.
Figure 1B:
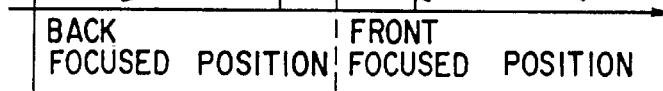
Figure 1C:
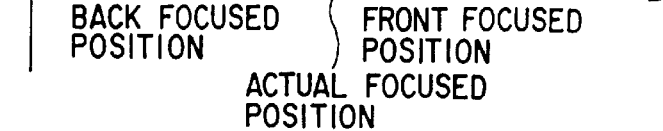
Figure 2:
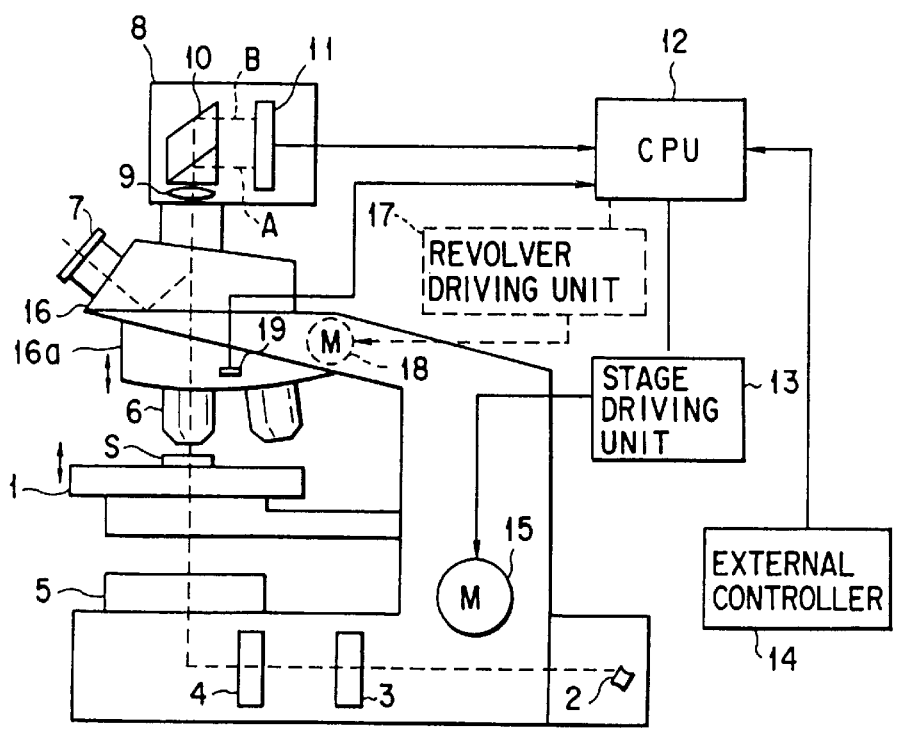
FIG. 2 schematically shows the configuration of a microscope including an automatic focusing apparatus according to a first embodiment of the present invention.

A microscope including the automatic focusing apparatus according to the first embodiment is provided with a light source 2 for illuminating a specimen S from below as shown in FIG. 2. The specimen S is an object to be observed put on a stage 1 that can move up and down. The illumination light from the light source 2 passes through an ND filter 3 for light reduction, a field stop 4, and a lens 5 and strikes the specimen S. The luminous flux from the specimen S passes through an objective 6 provided for a revolver 16a mounted on a body tube section 16 in such a manner that it can rotate. Part of the flux is directed to eyepieces 7 and the rest of the flux enters an autofocus sensor head 8. The flux having entered the autofocus sensor head 8 passes through an image forming lens 9 and an optical path difference prism 10 and makes an image on the incident surface of an image sensing element 11 serving as image sensing means. Specifically, the optical path difference prism 10 constitutes an optical path difference optical system which gives an optical path difference to a front position and a back position that are conjugate with respect to the image forming point. The prism 10 is designed to allow the two luminous fluxes differing in optical path (corresponding to a front focused position and a back focused position) to strike different parts of the image sensing element 11.

Then, a CPU 12 makes a focus judgment from a specimen image signal from the image sensing element 11, calculates a driving signal indicating the amount and direction of movement of the stage 1 to move the specimen S to the focused position according to the state, transmits the signal to a stage driving unit 13, causes the stage driving unit 13 to drive a stage moving motor 15, and thereby moves the stage 1 up and down in FIG. 2.

Instead of moving the stage 1 up and down, the CPU 12 may move the revolver 16a up and down. In this case, the CPU 12 calculates a driving signal indicating the amount and direction of movement of the revolver 16a to move the revolver 16a to a target position, transmits the signal to a revolver driving unit 17, causes the revolver driving unit 17 to drive a revolver moving motor 18, and thereby moves the revolver 16a up and down in FIG. 2.

The revolver 16a contains a sensing unit (sensor) 19 that senses six types (magnifications) of the objective 6. The result of sensing at the sensing unit 19, or the result of sensing what type of the objective 6 is presently inserted in the optical path facing the specimen S, is sent to the CPU 12.

A magnification setting signal for the objective 6 is inputted by the user via an external controller 14 to the CPU 12. Receiving the setting signal, the CPU 12 drives the revolver 16a to cause the objectives 6 with different magnifications to face the specimen 6 on the stage 1.

Focusing control in the automatic focusing apparatus according to the first embodiment will be explained in detail. Focusing control in the automatic focusing apparatus is divided into the following four control modes:

a. Search mode in which the specimen S is searched for;
b. Rough focus mode in which focusing is done once with a decreased accuracy of focusing for the specimen S;
c. Front and back defocus sensing mode in which the front and back focused states (the front focused position and the back focused position) are sensed with the stage in the position after the processing in the rough focus mode; and
d. Fine focus mode in which the degree of focusing of the specimen in the front and back defocus sensing mode is approximated linearly and the specimen S is directed to the focused position with high accuracy.

The operation executed in each of the modes in item a to item d in the optical path difference method will be described by reference to FIGS. 3A to 3D.

Figure 3A:
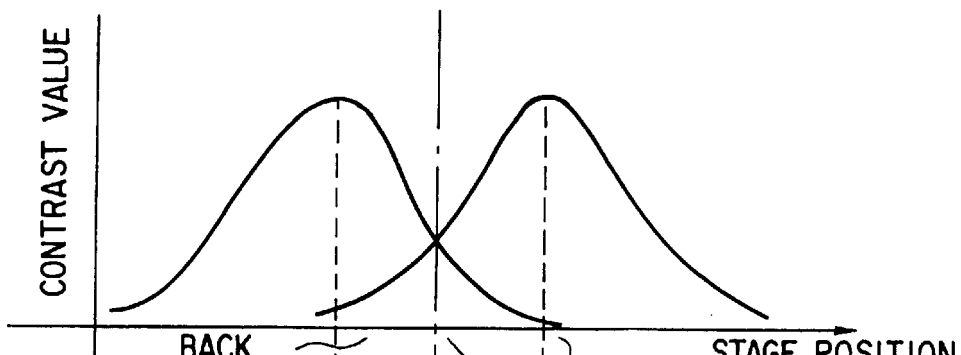
FIG. 3A to FIG. 3D show the contrast characteristic of the contrast value in the front focused position of the image of a specimen and that in the back focal point, the contrast value difference characteristic, the contrast value sum characteristic, and an enlarged view of part of the contrast value difference characteristic in the first embodiment.

FIG. 3A shows the characteristics of the contrast value of the specimen image in the front focused position and that in the back focused position. The abscissa expresses the position of the specimen on the stage 1 and the ordinate expresses contrast values.

The contrast values are obtained by calculating the product sum of the absolute value of the difference signal of adjacent image signals $D_k$, $D_{k-1}$ of the specimen image sensed by the image sensing element 11, as expressed by the following equation (1):

$$\text{Contrast value} = \sum_{k=1}^{n} |D_k - D_{k-1}| \qquad (1)$$

Figure 3B:
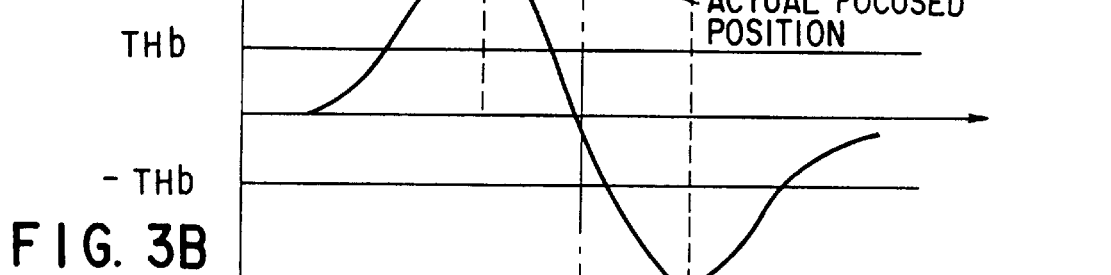

FIG. 3B shows the difference between the characteristic curve of contrast values in the front focused position and that of contrast values in the back focused position. The resulting curve is generally known as an S-shaped curve.

Figure 3C:
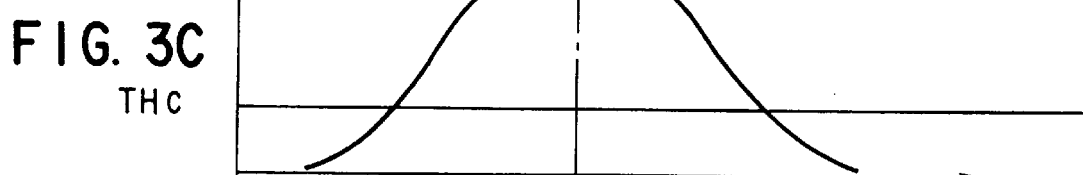

FIG. 3C shows a characteristic curve obtained by adding the characteristic curve of contrast values in the front focused position to that of contrast values in the back focused position.

Figure 3D:
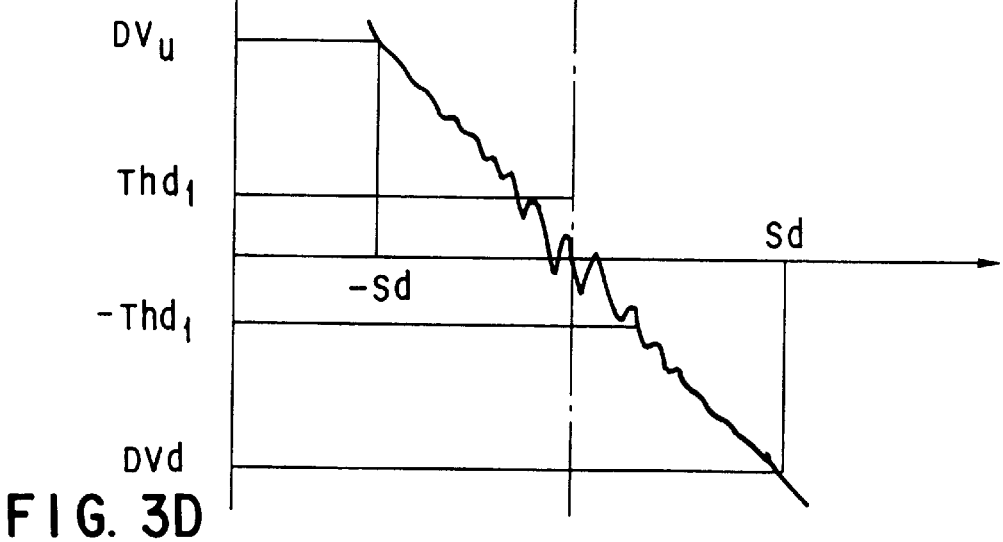

FIG. 3D is an enlarged view of the characteristic in the vicinity of the focused position shown in FIG. 3B. As shown in FIG. 3D, when the contrast of the specimen is low, the contrast values vary in a nonlinear manner in the vicinity of the focused position.

Figure 4:
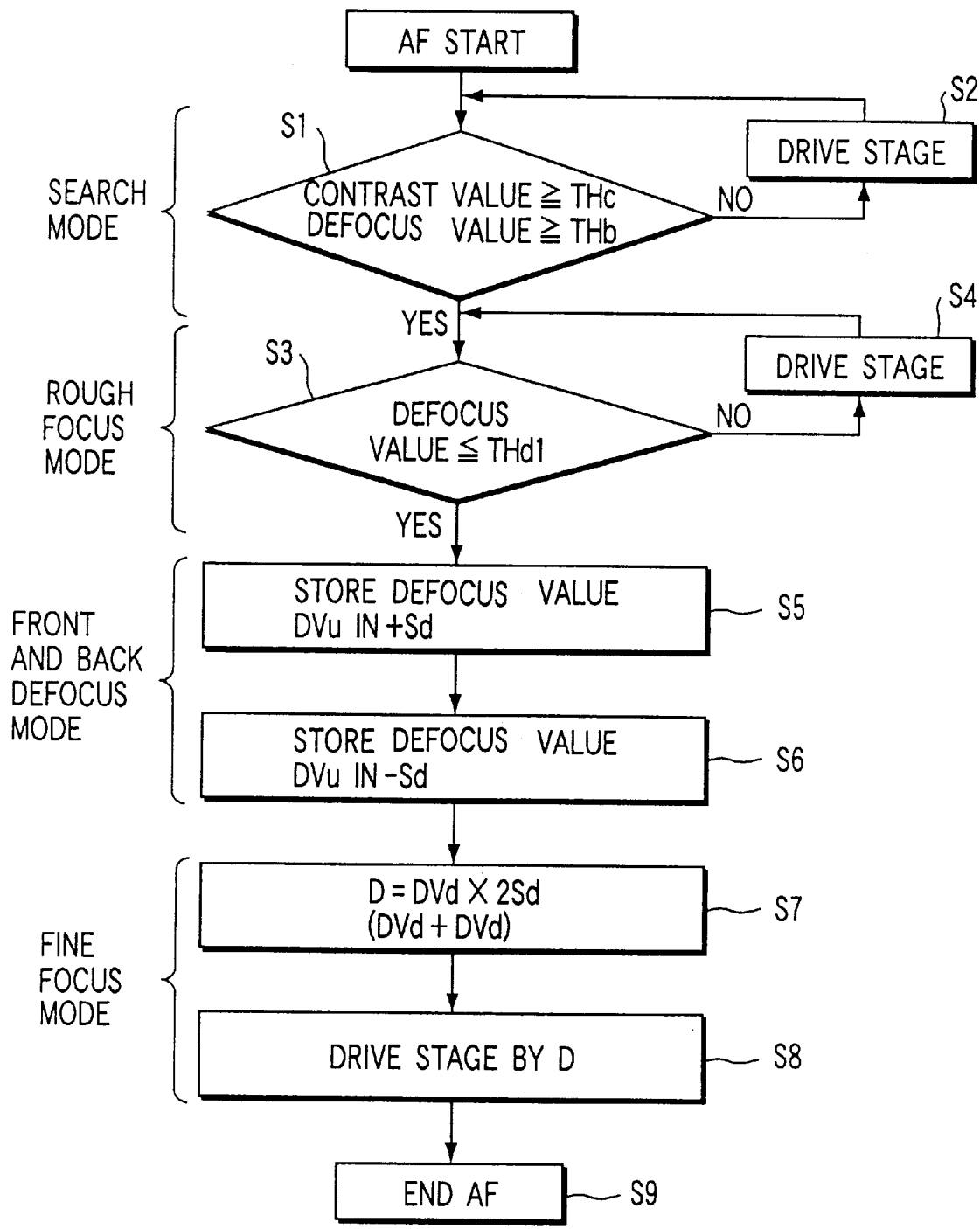
FIG. 4 is a flowchart to help explain the operation in the automatic focusing control mode in the first embodiment.

Next, the operation in automatic focusing (AF) control mode in the first embodiment will be described by reference to FIG. 4.

In the search mode, it is judged whether the sum of the contrast value in the front focused position and that in the back focused position is equal to or larger than a specific value of THc shown in FIG. 3C and whether the defocus value is equal to or larger than a specific value of THb shown in FIG. 3B (step S1). If the sum of the contrast values is smaller than the specific values THc and THb, the stage 1 will be driven until the sum of the contrast values becomes equal to or larger than the specific values THc and THb (step S2). By the operation, the specimen S is searched for.

In the defocus mode, a check is made to see if the defocus value is within a specific value of THd1 shown in FIG. 3D (step S3). The stage 1 is driven so that the defocus value may fall in the specific value THd1 (step S4). By the operation, the apparatus is focused on the specimen S. If the apparatus is focused sufficiently with the necessary accuracy of focusing in the operation, the operations in the following two modes (the front and back defocus sensing mode and the fine defocus mode) may be omitted.

In the front and back defocus sensing mode, the stage 1 is raised by the amount of drive Sd differing with the type of the objective 6 and the defocus value DVu of the S-shaped curve is stored (step S5).

Next, the stage 1 is lowered by a specific amount (2×Sd) and the defocus value DVd of the S-shaped curve is stored (step S6). In the fine focus mode, a distance of D to the focused position or the zero cross point, is calculated from the defocus values DVu and DVd and the amount of drive Sd using the following equation (2) (step S7):

$$D=(DVd \times 2Sd)/(DVd+DVu) \qquad (2)$$

In the fine focus mode, the stage 1 is driven by the distance D to the focused position on the basis of the result of calculation in the front and back defocus sensing mode (step S8) and the AF operation is completed (step S9).

The automatic focusing apparatus of the first embodiment controlled as described above achieves the accuracy of focusing that could not be achieved by a conventional equivalent.

Figure 5:
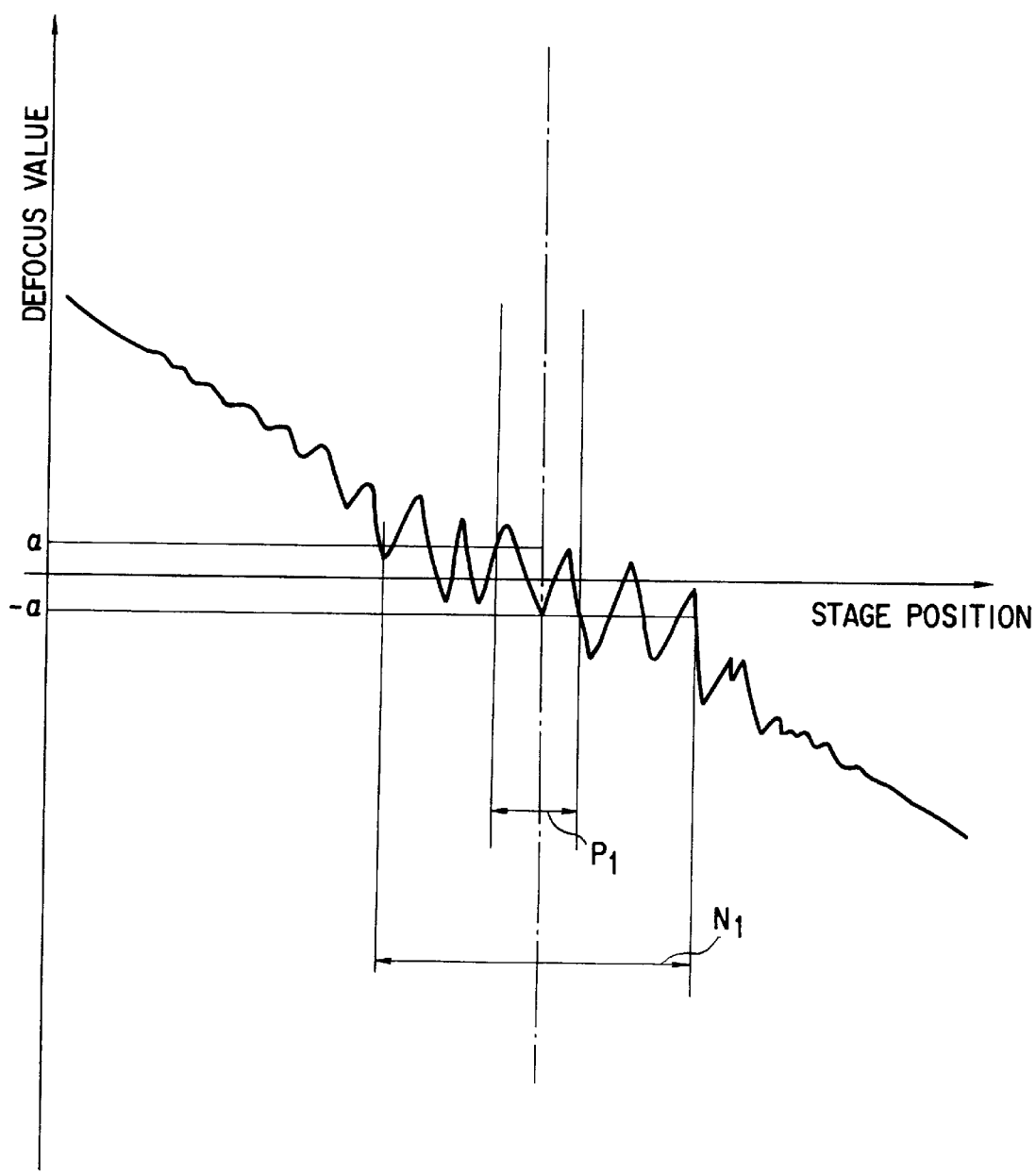
FIG. 5 shows a characteristic diagram showing the relationship between the position of the stage and the defocus value in the first embodiment.

For example, in the case of a specimen S whose defocus values vary in the focused position as shown in FIG. 5, variations in the defocus value have an adverse effect on a conventional automatic focusing apparatus that performs control in such a manner that it judges that the apparatus has been brought into focus if the defocus value is α or less. As a result, it might judge that the apparatus has been brought into focus at the position of the stage (N1 in FIG. 5) before the focused range P1 of FIG. 5 into which the stage is to be driven, abnormal operation of the stage servo near the focused position, or hunting, might take place, leading to loose focusing, or the automatic focusing apparatus might operate erroneously.

Because the automatic focusing apparatus of the first embodiment makes focusing judgments using the stage position on which variations in the defocus value have no effect, there is no possibility that hunting will occur. Unlike the conventional apparatus using the defocus value a to judge that the specimen is in focus, the apparatus of the first embodiment enables the accuracy of focusing to be achieved stably without an adverse effect of low contrast of the specimen S.

Accordingly, with the automatic focusing apparatus of the first embodiment, even when the contrast of the specimen S is low or when the magnification of the objective 6 is changed variously, a stable, high accuracy of focusing can be achieved without using a special optical system.

While in the first embodiment, the stage driving unit 13 has driven the stage 1 to bring the specimen S in focus, the zoom optical system (not shown) and the objective 6 may be driven to cause the specimen S to be in focus, which will produce a similar effect to that in the first embodiment.

While defocus values before and after the rough focus mode position are used in the front and back defocus sensing mode, defocus values at two points either before or after the rough focus mode position may be sensed and linear approximation be made to execute the fine focus mode, which will produce a similar effect to that explained above.

Second Embodiment

A second embodiment of the present invention will be explained. Because the configuration of an automatic focusing apparatus according to the second embodiment of the present invention is similar to that of the first embodiment, automatic focusing control according to the change of the magnification of the objective 6, characterizing the second embodiment, will be explained.

Automatic focusing control is closely related to the focusing range of the objective 6, i.e., the focal depth. If the wavelength is $\lambda$ and the numerical aperture is NA, the focal depth of the objective 6 in the specimen position will be expressed by the following equation (3):

$$\text{Focal depth}=\lambda/(NA)^2 \qquad (3)$$

For example, the relationship between the magnification of the objective 6, NA, and the focal depth is as shown in FIG. 6. FIG. 6 shows the result of measurements made using light with a wavelength $\lambda$ of 555 nm.

In FIG. 6, for example, when the objective 6 has a magnification of ×1.25, the focal depth is 343 $\mu$m; and when the objective 6 has a magnification of ×10, the focal depth is 3.4 $\mu$m.

The thickness of the specimen S is generally about 10 $\mu$m. In consideration of the thickness of the specimen S with respect to the focal depth of the objective 6, when the objective 6 has a magnification of ×1, the objective has to be focused at 1/30 of the focal depth; and when the objective 6 has a magnification of ×10, the objective has to be focused at three times the focal depth, which permits focusing control to be carried out less strictly than at the ×1 magnification.

Figure 7:
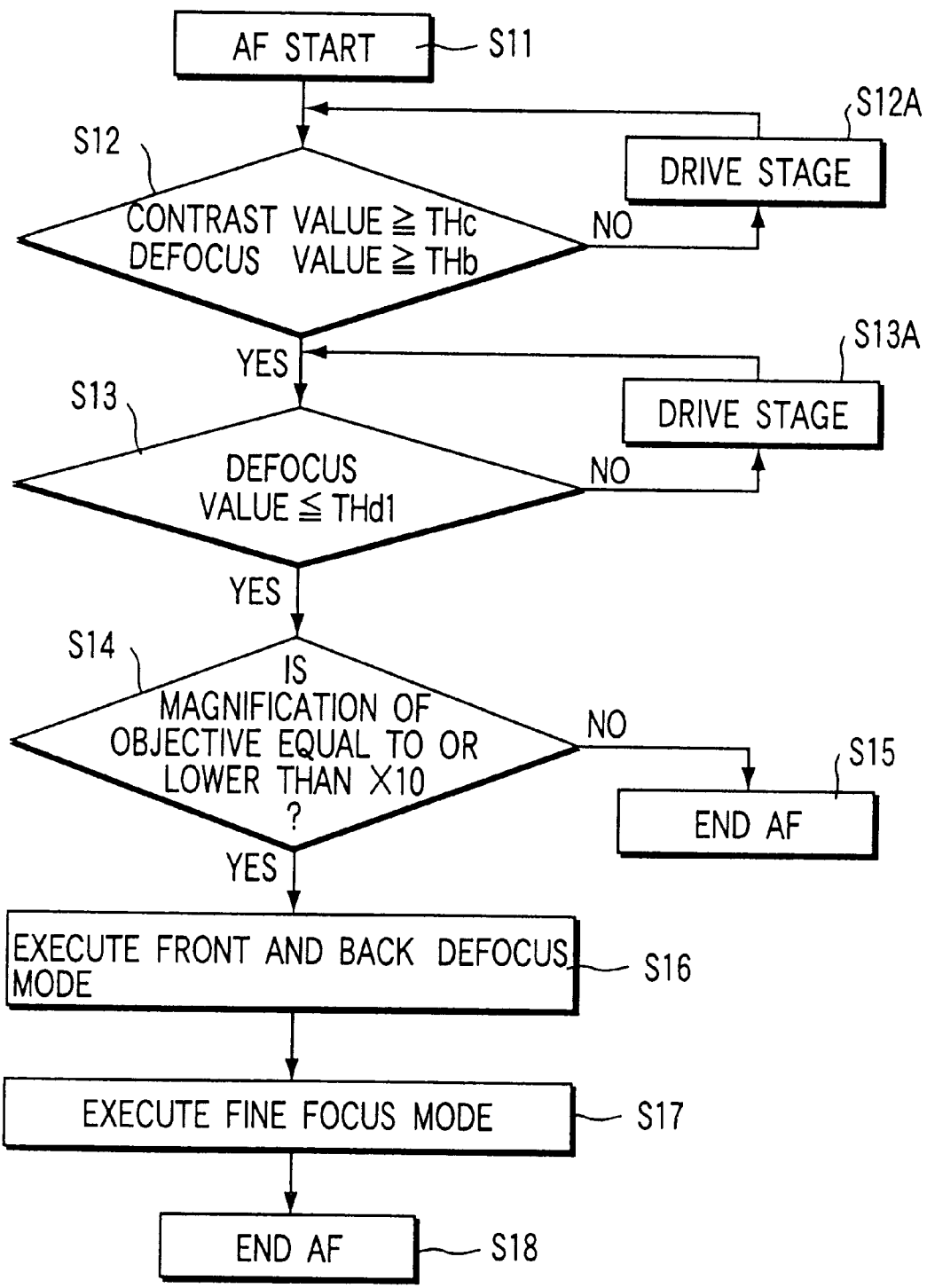
FIG. 7 is a flowchart to help explain the operation in the automatic focusing control mode in a second embodiment of the present invention.

Therefore, in the second embodiment, the focusing control mode is changed depending on the type of the objective 6, taking into account the thickness of the specimen. The operation of the second embodiment will be described by reference to FIG. 7.

In the second embodiment, when the automatic focusing operation starts (step S11), the operation goes into the search mode as in the first embodiment. In the search mode, the stage 1 is driven (step S12A) until the sum of the contrast value in the front focused position and that in the back focused position is equal to or larger than a specific value of Thc and the S-shaped curve has a specific value of THb or more (step S12). Then, the operation changes to the rough defocus mode. In this mode, the stage 1 is driven (step S13A) so that the S-shaped curve may have a value within a specific value of Thd (step S13).

If the sensed present magnification of the objective 6 is equal to ×10 or more (step S14) and the thickness of the specimen S is sufficiently large for its focal depth, the automatic focusing operation will be completed (step S15).

If the thickness of the specimen S is small for the focal depth, the front and back defocus sensing mode (step S16) and the fine focus mode (step S17) will be executed and the automatic focusing operation will be completed (step S18).

When the objective has as very low a magnification as ×1 or less, the S-shaped curve extends over a wide range as seen from the value of the focal depth in FIG. 6. Because the stage 1 can generally move up and down in the range of about 20 mm, just putting the specimen S on the stage 1 produces an S-shaped curve.

This eliminates the necessity of searching for the specimen S and enables the order of automatic focusing control to be determined as follows:

1. Rough focus mode
2. Front and back defocus sensing mode
3. Fine focus mode

As described above, when the search mode is omitted in using the objective 6 with an extremely low magnification, this helps increase the focusing speed. The above control is effective in a case where a sufficient stage stroke (the range in which the stage can be driven) cannot be secured.

With the automatic focusing apparatus according to the second embodiment, the control method is partially omitted or changed in accordance with the type (magnification) of the objective 6. This eliminates the need for a special optical system or optical elements for changing the optical path as found in a conventional equivalent. Therefore, automatic focusing can be done with high accuracy in a range from extremely low to high magnifications.

While in the second embodiment, part of the operation modes are omitted or changed in accordance with the magnification of the objective 6 because the magnification of the objective 6 is closely related to NA, focusing control may be done on the basis of NA of the objective 6 or NA of the lighting system. This will produce a similar effect to that described above.

Third embodiment

A third embodiment of the present invention will be explained. Because the configuration of an automatic focusing apparatus according to the third embodiment of the present invention is similar to that of the first or second embodiment, automatic focusing control by the objective 6 with an extremely low magnification, characterizing the third embodiment, will be explained by reference to FIG. 8.

In the second embodiment, the search mode has been omitted in the automatic focusing operation of the objective 6 with an extremely low magnification. When the image of the specimen is not formed on the image sensing element 11 in spite of the wide field of vision of the objective 6 with an extremely low magnification, sensing is done in the absence of the specimen S in the front and back defocus sensing mode or in the fine focus mode, which may become a problem.

Figure 8:
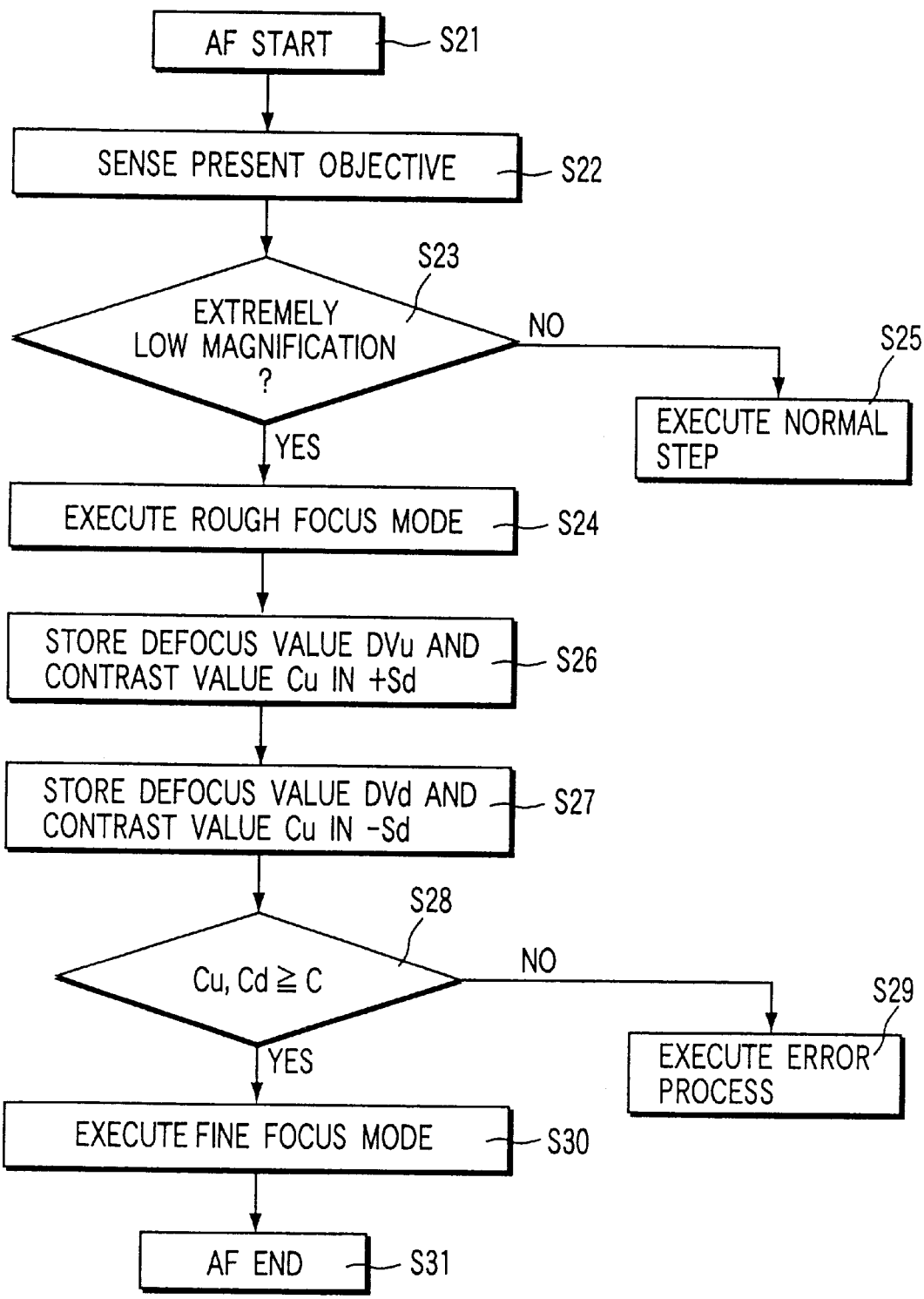
FIG. 8 is a flowchart to help explain the operation in the automatic focusing control mode in a third embodiment of the present invention.

The third embodiment overcomes the problem through the operation shown in FIG. 8.

In the third embodiment, when automatic focusing is started (step S21), the magnification of the objective 6 present in the optical path of the microscope (step S22) is sensed. If the magnification of the present objective 6 is extremely low (step S23), the rough defocus mode will be turned on and the stage will be driven so that the S-shaped curve may fall in a specific value (step S24). If the magnification is not extremely low, a normal operation will be carried out (step S25).

Next, in the front and back defocus sensing mode, the stage 1 is raised by the amount of drive Sd differing with the type of the objective 6 and the defocus value DVu of the S-shaped curve is stored and the contrast value Cu of the specimen at that position is also stored (step S26).

Next, the stage 1 is lowered by a specific amount (2Sd), the defocus value DVd of the S-shaped curve is stored, and the contrast value Cd of the specimen S at that position is also stored (step S27).

Then, it is judged whether both of the contrast values Cu and Cd are equal to or larger than a specific value of Cc (step S28). If they are smaller than the specific value Cc, it will be judged that the contrast of the specimen S is low and the user will be informed of an error and the automatic focusing control will be terminated (step S29).

If both the contrast values Cu and Cd are equal to or larger than the specific value Cc, the fine focus mode will be executed (step S30). From the defocus values DVu and DVd and the Sd, the focused position or the zero cross point will be calculated using equation (2) and the focusing operation be completed (step S31).

With the automatic focusing apparatus of the third embodiment, when the objective 6 with an extremely low magnification has not formed the image of the specimen S on the image sensing element 11 because an insufficient stage stroke has prevented the specimen from being searched for, it is possible to give a caution to the user as in using the other objectives 6.

While in the third embodiment, the automatic focusing apparatus has judged whether the low contrast judgment value has been cleared in both of the upward movement and the downward movement of the stage 1, the judgment may be made in either the upward movement or the downward movement.

According to the present invention, the following configurations may be provided:

(1) An automatic focusing apparatus for a microscope comprising: mounting means on which an object to be observed is placed; an objective caused to face the object on the mounting means; driving means for driving at least one of the mounting means and the objective; an image forming optical system for forming an image of the object via the objective; an optical path difference optical system for giving an optical path difference to a front position and a back position that are conjugate with respect to the image forming point of the image forming optical system; image sensing means for sensing the image of the object via the optical path difference optical system; and control means for determining the degree of focusing of the object on the basis of image information from the image sensing means and causing the driving means to operate to direct the object on the mounting means to a focused position, wherein the control means has four automatic focusing control modes: an object search mode in which an object to be observed is searched for, a rough focus mode in which the object is brought to a roughly focused position with a lower accuracy of focusing a front and back defocus sensing mode in which the degrees of front and back focusing of the object in at least a front and a back place with respect to the roughly focused position in the rough focus mode are determined, and a fine focus mode in which the degree of focusing of the object with a higher accuracy of focusing is approximated linearly on the basis of the degrees of front and back focusing determined in the front and back defocus sensing mode and the object is brought to the focused position. With this configuration, it is possible to provide a highly reliable automatic focusing apparatus for a microscope which secures a high accuracy of focusing in spite of the change of the magnification of the objective or an object to be observed with a low contrast value without making the apparatus larger or raising costs.

(2) The automatic focusing apparatus in item (1), wherein the control means changes the order in which the four modes are executed or omits part of the four modes in accordance with the change of the image forming performance of the image forming optical system including the magnification of the objective in executing the four automatic focusing control modes. For example, when the magnification of the objective is equal to or larger than a specific value, the execution of the front and back defocus sensing mode and the fine focus mode may be omitted. When the magnification of the objective is lower than the specific value, the execution of the object search mode may be omitted. With this configuration, because the order in which the four automatic focusing control modes can be changed or part of the modes can be omitted in executing the modes, it is possible to provide an automatic focusing apparatus which assures a higher accuracy of focusing and a high focusing speed according to the change of the image forming performance including the magnification of the objective.

(3) The automatic focusing apparatus in item (1), wherein the control means, in the front and back defocus sensing mode, determines the contrast value of the object when the magnification of the objective is extremely low and changes the mode to the fine focus mode only when the contrast value is equal to or larger than a specific value. With this configuration, it is possible to provide an automatic focusing apparatus capable of performing automatic focusing control reliably even when a stage stroke cannot be secured because of an extremely low magnification and it is difficult to search for an object to be observed.

(4) The automatic focusing apparatus in item (1) further comprising means for sensing the type of the objective used and informing the control means of the sensed type. With this configuration, the control means reliably finds out the type or magnification of the objective used and carries out a suitable process according to the type or magnification of the objective.

(5) The automatic focusing apparatus in item (1) further comprising an external controller for instructing the control means on the magnification of an objective to be used. With this configuration, an objective with the magnification the user wants can be set easily.

(6) The automatic focusing apparatus in item (1), wherein the control means, in the object search mode, senses a position at which the sum of the contrast value in the front position and that in the back position is equal to or larger than a specific value and the difference between the contrast value in the back position and that in the front position is equal to or larger than a specific value. With this configuration, it is possible to reliably search for an object to be observed in the object search mode.

(7) The automatic focusing apparatus in item (1), wherein at least the front place and the back place in the front and back defocus sensing mode are located in positions on which variations in the defocus value have no effect. With this configuration, front and back defocus sensing is done reliably in the front and back defocus sensing mode.

(8) The automatic focusing apparatus in item (1), wherein the control means, in the fine focus mode, calculates the driving distance from the front place and the back place to the focused position on the basis of the degrees of front and back focusing determined in the front and back defocus sensing mode. With this configuration, fine focusing is done reliably in the fine focus mode.

(9) An automatic focusing apparatus for a microscope comprising: mounting means on which an object to be observed is placed; an objective caused to face the object on the mounting means; driving means for driving at least one of the mounting means and the objective; an image forming optical system for forming an image of the object via the objective; an optical path difference optical system for giving an optical path difference to a front position and a back position that are conjugate with respect to the image forming point of the image forming optical system; image sensing means for sensing the image of the object via the optical path difference optical system; and control means for determining the degree of focusing of the object on the basis of image information from the image sensing means and causing the driving means to operate to direct the object on the mounting means to a focused position, wherein the control means has four automatic focusing control modes: an object search mode in which an object to be observed is searched for, a rough focus mode in which the object is brought to a roughly focused position with a lower accuracy of focusing, a defocus sensing mode in which the degree of focusing of the object in two places either in front of or behind the roughly focused position in the rough focus mode is determined, and a fine focus mode in which the degree of focusing of the object with a higher accuracy of focusing is approximated linearly on the basis of the degree of focusing determined in the defocus sensing mode and the object is brought to the focused position. With this configuration, even when the degree of focusing of the object cannot be sensed physically either in front of or behind the roughly focused position, the object can be brought to the focused position by finding the degree of focusing of the object in two places on the other side of the roughly focused position.

(10) An automatic focusing apparatus for a microscope comprising: mounting means on which an object to be observed is placed; an objective caused to face the object on the mounting means; driving means for driving at least one of the mounting means and the objective; an image forming optical system for forming an image of the object via the objective; an optical path difference optical system for giving an optical path difference to a front position and a back position that are conjugate with respect to the image forming point of the image forming optical system; image sensing means for sensing the image of the object via the optical path difference optical system; and control means for determining the degree of focusing of the object on the basis of image information from the image sensing means and causing the driving means to operate to direct the object on the mounting means to a focused position, wherein the control means has four automatic focusing control modes: an object search mode in which an object to be observed is searched for by sensing a position at which the sum of the contrast value in the front position and that in the back position is equal to or larger than a specific value and the difference between the contrast value in the back position and that in the front position is equal to or larger than a specific value, a rough focus mode in which the object is brought to a roughly focused position with a lower accuracy of focusing, a front and back defocus sensing mode in which the degrees of front and back focusing of the object in at least a place in front of and a place behind the roughly focused position in the rough focus mode, both places unaffected by variations in the defocus value, are determined, and a fine focus mode in which the degree of focusing of the object with a higher accuracy of focusing is approximated linearly by calculating the driving distance from the front place to the focused position and that from the back place to the focused position on the basis of the degree of the front and back focusing determined in the front and back defocus sensing mode and the object is brought to the focused position. With the configuration, control can be performed in each of the four automatic focusing modes reliably.

As described above in detail, with the present invention, it is possible to a highly reliable automatic focusing apparatus for a microscope which secures a high accuracy of focusing in spite of the change of the magnification of an objective or an object to be observed with a low contrast value without making the apparatus larger or raising costs.

Furthermore, with the present invention, it is possible to provide an automatic focusing apparatus for a microscope which assures a higher accuracy of focusing and a high focusing speed according to the change of the image forming performance including the magnification of the objective.

Still furthermore, with the present invention, it is possible to provide an automatic focusing apparatus for a microscope capable of performing automatic focusing control reliably even when a stage stroke cannot be secured because of an extremely low magnifi- cation and it is difficult to search for an object to be observed.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An automatic focusing apparatus for a microscope, comprising:

mounting means on which an object to be observed is placed;

an objective caused to face the object on said mounting means;

driving means for driving at least one of said mounting means and said objective;

an image forming optical system for forming an image of said object via said objective;

an optical path difference optical system for giving an optical path difference to a front focused position and a back position that are conjugate with respect to the image forming point of said image forming optical system;

image sensing means for sensing the image of said object via said optical path difference optical system; and control means for determining the degree of focusing of said object on the basis of image information from said image sensing means and-causing said driving means to operate to direct said object on said mounting means to a focused position, wherein said control means has four automatic focusing control modes:

an object search mode in which an object to be observed is searched for, a rough focus mode in which said object is brought to a roughly focused position with a lower accuracy of focusing, a front and back defocus sensing mode in which the degrees of front and back focusing of said object in at least a front and a back place with respect to the roughly focused position in said rough focus mode are determined, and a fine focus mode in which the degree of focusing of said object with a higher accuracy of focusing is approximated linearly on the basis of the degrees of front and back focusing determined in said front and back defocus sensing mode and said object is brought to said focused position.

2. An apparatus according to claim 1, wherein said control means changes the order in which said four modes are executed or omits part of said four modes in accordance with the change of the image forming performance of said image forming optical system including the magnification of said objective in executing said four automatic focusing control modes.

3. An apparatus according to claim 1, wherein said control means omits the execution of said front and back defocus sensing mode and said fine focus mode when the magnification of said objective is equal to or larger than a specific value.

4. An apparatus according to claim 1, wherein said control means omits the execution of said object search mode when the magnification of said objective is lower than a specific value.

5. An apparatus according to claim 1, wherein said control means, in said front and back defocus sensing mode, determines the contrast value of said object when the magnification of said objective is extremely low and changes the mode to said fine focus mode only when the contrast value is equal to or larger than a specific value.

6. An apparatus according to claim 1, further comprising means for sensing the type of said objective used and informing said control means of the sensed type.

7. An apparatus according to claim 1, further comprising an external controller for instructing said control means on the magnification of an objective to be used.

8. An apparatus according to claim 1, wherein said control means, in said object search mode, senses a position at which the sum of the contrast value in said front position and that in said back position is equal to or larger than a specific value and the difference between the contrast value in said back position and that in said front position is equal to or larger than a specific value.

9. An apparatus according to claim 1, wherein at least said front place and said back place in said front and back defocus sensing mode are located in positions on which variations in the defocus value have no effect.

10. An apparatus according to claim 1, wherein said control means, in said fine focus mode, calculates the driving distance from one of said front place and said back place to the focused position on the basis of the degrees of front and back focusing determined in said front and back defocus sensing mode.

11. An automatic focusing apparatus for a microscope, comprising:

mounting means on which an object to be observed is placed;

an objective caused to face said object on said mounting means;

driving means for driving at least one of said mounting means and said objective;

an image forming optical system for forming an image of said object via said objective;

an optical path difference optical system for giving an optical path difference to a front position and a back position that are conjugate with respect to the image forming point of said image forming optical system;

image sensing means for sensing the image of said object via said optical path difference optical system; and control means for determining the degree of focusing of said object on the basis of image information from said image sensing means and causing said driving means to operate to direct said object on said mounting means to a focused position, wherein said control means has four automatic focusing control modes:

an object search mode in which an object to be observed is searched for, a rough focus mode in which said object is brought to a roughly focused position with a lower accuracy of focusing, a defocus sensing mode in which the degree of focusing of said object in two places either in front of or behind the roughly focused position in said rough focus mode is determined, and a fine focus mode in which the degree of focusing of said object with a higher accuracy of focusing is approximated linearly on the basis of the degree of focusing determined in said defocus sensing mode and said object is brought to said focused position.

12. An automatic focusing apparatus for a microscope, comprising:

mounting means on which an object to be observed is placed;

an objective caused to face said object on said mounting means;

driving means for driving at least one of said mounting means and said objective;

an image forming optical system for forming an image of said observed object via said objective;

an optical path difference optical system for giving an optical path difference to a front position and a back position that are conjugate with respect to the image forming point of said image forming optical system;

image sensing means for sensing the image of said object via said optical path difference optical system; and control means for determining the degree of focusing of said object on the basis of image information from said image sensing means and causing said driving means to operate to direct said object on the mounting means to a focused position, wherein said control means has four automatic focusing control modes:

an object search mode in which an object to be observed is searched for by sensing a position at which the sum of the contrast value in said front position and that in said back position is equal to or larger than a specific value and the difference between the contrast value in said back position and that in said front position is equal to or larger than a specific value, a rough focus mode in which said object is brought to a roughly focused position with a lower accuracy of focusing, a front and back defocus sensing mode in which the degrees of front and back focusing of said object in at least a place in front of and a place behind the roughly focused position in said rough focus mode, both places unaffected by variations in the defocus value, are determined, and a fine focus mode in which the degree of focusing of said object with a higher accuracy of focusing is approximated linearly by calculating the driving distance from said front place to the focused position and that from said back place to the focused position on the basis of the degrees of front and back focusing determined in said front and back defocus sensing mode and said object is brought to said focused position.

* * * * *